United States Patent
Renaud et al.

(10) Patent No.: US 12,411,246 B2
(45) Date of Patent: Sep. 9, 2025

(54) LIGHT DEVICE OF A VEHICLE

(71) Applicant: VALEO VISION, Bobigny (FR)

(72) Inventors: Pierre Renaud, Bobigny (FR);
Gregory Planche, Bobigny (FR);
Anthony Lozano, Bobigny (FR);
Alexandre Joerg, Bobigny (FR)

(73) Assignee: VALEO VISION, Bobigny (FR)

( * ) Notice: Subject to any disclaimer, the term of this patent is extended or adjusted under 35 U.S.C. 154(b) by 848 days.

(21) Appl. No.: 17/760,699

(22) PCT Filed: Sep. 15, 2020

(86) PCT No.: PCT/EP2020/075782
§ 371 (c)(1),
(2) Date: Mar. 15, 2022

(87) PCT Pub. No.: WO2021/052972
PCT Pub. Date: Mar. 25, 2021

(65) Prior Publication Data
US 2022/0342079 A1    Oct. 27, 2022

(30) Foreign Application Priority Data
Sep. 16, 2019 (FR) ...................................... 1910197

(51) Int. Cl.
F21S 41/20 (2018.01)
F21S 43/20 (2018.01)
G01S 7/481 (2006.01)
G01S 17/931 (2020.01)

(52) U.S. Cl.
CPC ............. *G01S 17/931* (2020.01); *F21S 41/28* (2018.01); *F21S 43/26* (2018.01); *G01S 7/4813* (2013.01)

(58) Field of Classification Search
None
See application file for complete search history.

(56) References Cited

U.S. PATENT DOCUMENTS

2018/0045826 A1   2/2018   Kasaba et al.
2018/0229645 A1   8/2018   Hara et al.
2018/0231206 A1   8/2018   Hara et al.
(Continued)

FOREIGN PATENT DOCUMENTS

CN   1535867 A    10/2004
CN   108302434 A   7/2018
CN   108413351 A   8/2018
(Continued)

OTHER PUBLICATIONS

International Search Report issued on Nov. 19, 2020 in PCT/EP2020/075782 filed on Sep. 15, 2020, 2 pages.
(Continued)

*Primary Examiner* — Hovhannes Baghdasaryan
(74) *Attorney, Agent, or Firm* — Oblon, McClelland, Maier & Neustadt, L.L.P.

(57) ABSTRACT

A lighting device for a vehicle including at least one light source, at least one sensor configured to acquire information outside the vehicle based on infrared. A cover including a first portion covers the at least one light source and a second portion that is opaque to visible light and to infrared. The cover further includes a third portion that is opaque to visible light and transparent to infrared, substantially centered on said at least one sensor and integrated into the second portion.

20 Claims, 4 Drawing Sheets

(56) References Cited

U.S. PATENT DOCUMENTS

Figure 1:
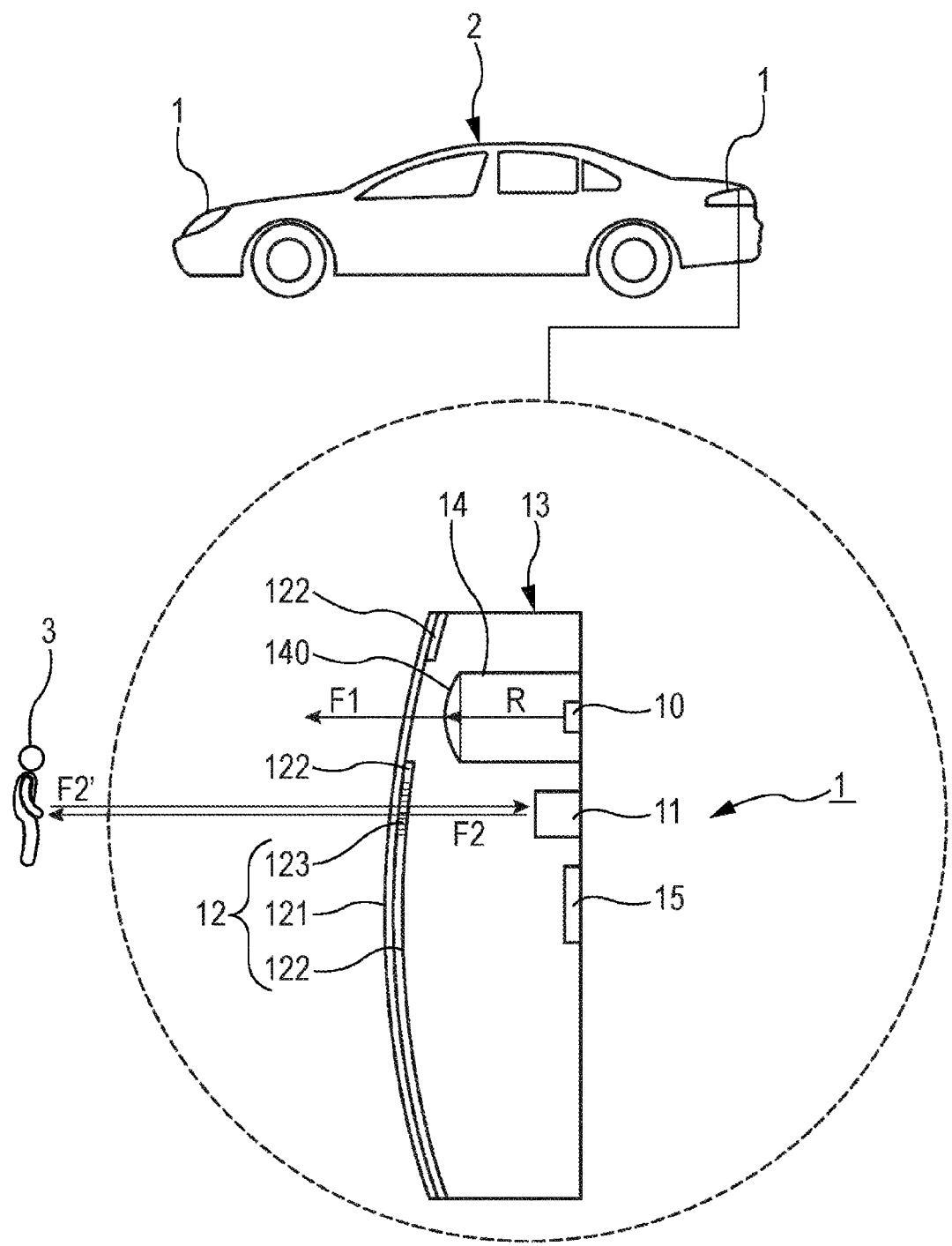

2019/0126813 A1     5/2019   Hamlin et al.

FOREIGN PATENT DOCUMENTS

| CN | 108458316 A | 8/2018 |
| CN | 108494909 A | 9/2018 |
| CN | 108534084 A | 9/2018 |
| EP | 0 952 388 A2 | 10/1999 |
| FR | 3 055 042 A1 | 2/2018 |
| FR | 3 062 891 A1 | 8/2018 |
| JP | 2015-40824 A | 3/2015 |
| JP | 2015-43279 A | 3/2015 |
| WO | WO 2018/124206 A1 | 7/2018 |
| WO | WO 2019/058834 A1 | 3/2019 |

OTHER PUBLICATIONS

Combined Chinese Office Action and Search Report issued Jan. 30, 2024, in corresponding Chinese Patent Application No. 202080058008.7 (with English Translation of Category of Cited Documents), 8 pages.

LIGHT DEVICE OF A VEHICLE

The present invention relates to a lighting device for a vehicle. It is particularly applicable, but not limited, to motor vehicles.

In the field of motor vehicles, a lighting device for a vehicle known to those skilled in the art comprises a housing, a light source arranged in the housing, a sensor arranged in the housing and configured to acquire information outside the vehicle based on invisible light, and a cover for closing said housing and comprising a first portion covering the light source and a second portion covering the sensor, in which the second portion has a transmission capacity for visible light that is lower than the first portion. The second portion has a gray or black appearance and also serves an esthetic function.

One drawback of this prior art is that the second portion which serves an esthetic function therefore covers a large portion of the cover, and the light rays such as infrared rays from outside the vehicle which therefore pass through the second portion, which extends over a large area, degrade elements of the lighting device which are located behind this second portion, such as electronic components or said housing.

In this context, the present invention aims to provide a lighting device that allows the stated drawback to be remedied.

To that end, the invention provides a lighting device for a vehicle, comprising at least one light source, at least one sensor configured to acquire information outside the vehicle based on infrared, and a cover comprising a first portion covering said at least one light source and a second portion that is opaque to visible light and to infrared, characterized in that said cover further comprises a third portion that is opaque to visible light and transparent to infrared, substantially centered on said at least one sensor and integrated into the second portion.

Thus, as will be seen in detail hereinbelow, the third portion, which is integrated into the second portion and centered on the sensor, makes it possible to have a region that allows infrared to pass through but is limited in terms of size. Consequently, the light rays that arrive from outside the vehicle cannot degrade the interior regions of the lighting device since they have only a very small area to pass through the cover.

According to some non-limiting embodiments, the lighting device may further comprise one or more of the following additional features taken alone or in any technically possible combination, from among the following.

According to one non-limiting embodiment, said at least one sensor is a lidar.

According to one non-limiting embodiment, said lighting device comprises a plurality of light sources.

According to one non-limiting embodiment, said lighting device comprises a plurality of sensors.

According to one non-limiting embodiment, said cover is made of poly(methyl methacrylate) or of polycarbonate.

According to one non-limiting embodiment, said third portion comprises a transmission capacity for visible light that is lower than said first portion.

According to one non-limiting embodiment, said at least one light source is a semiconductor, halogen, xenon, or laser light source.

According to one non-limiting embodiment, said lighting device is a headlight or a tail light.

According to one non-limiting embodiment, said second portion and said third portion are covered by said first portion of said cover which is coated over them.

According to one non-limiting embodiment, said first portion, said second portion and said third portion of said cover are arranged edge to edge.

According to one non-limiting embodiment, said first portion, said second portion and said third portion of said cover are injected.

According to one non-limiting embodiment, said first portion, said second portion and said third portion are overmolded.

According to one non-limiting embodiment, said first portion, said second portion and said third portion are assembled together.

According to one non-limiting embodiment, two portions of said first portion, second portion and third portion are overmolded and the other portion of said first portion, second portion and third portion is assembled together with at least one of said two overmolded portions, or vice versa.

According to one non-limiting embodiment, said second portion has a transmission capacity for visible light that is lower than said first portion.

According to one non-limiting embodiment, said second portion has a transmission capacity for infrared that is lower than said third portion.

According to one non-limiting embodiment, said third portion covers said at least one sensor. It is arranged facing said at least one sensor.

Figure 2:
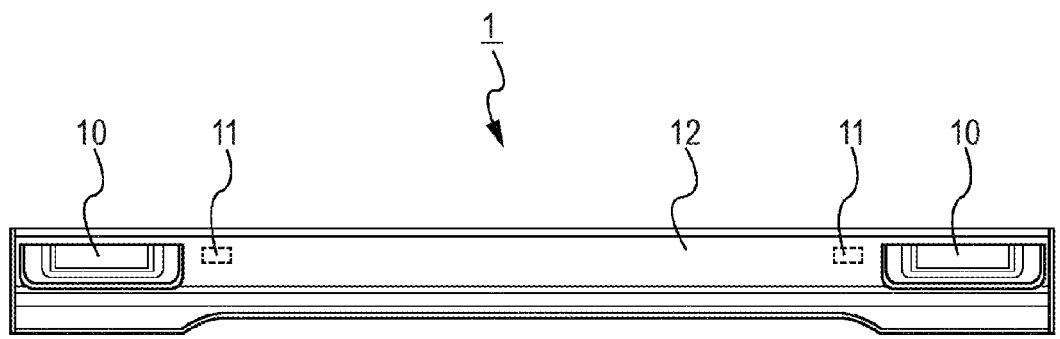
Figure 3:
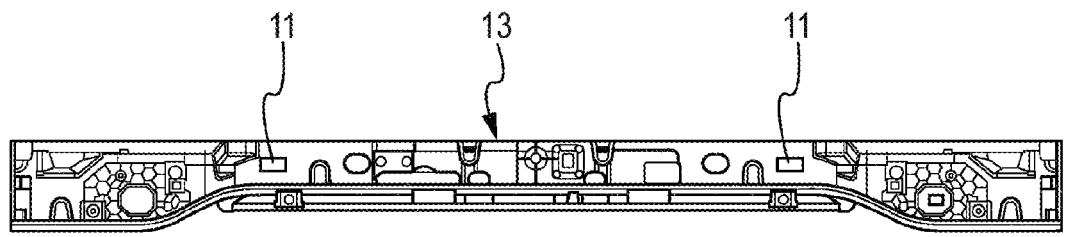
Figure 4:
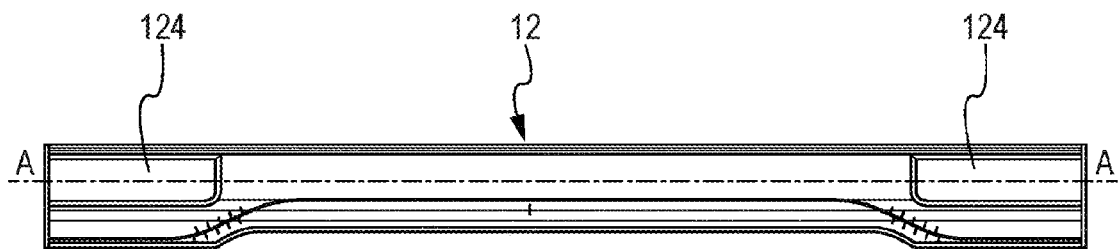
Figure 5:
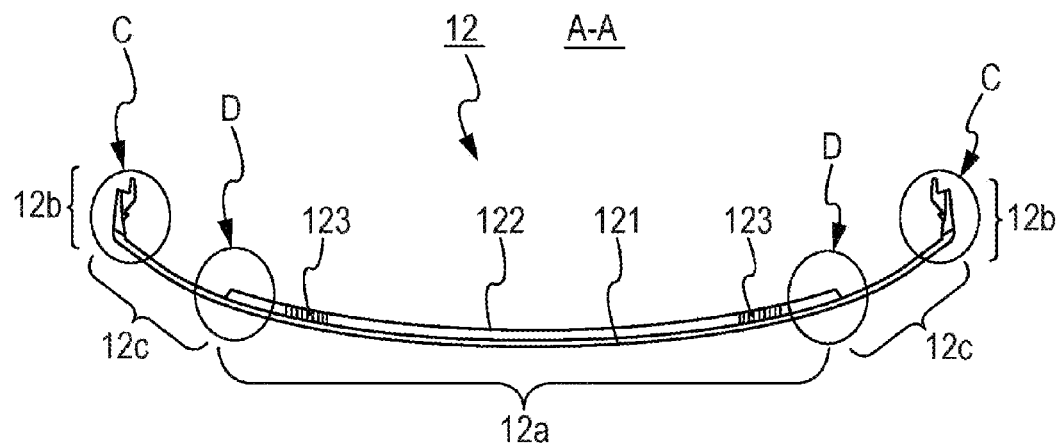
Figure 6:
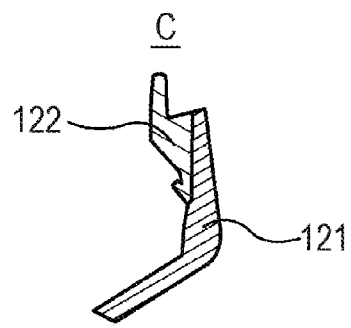
Figure 7:
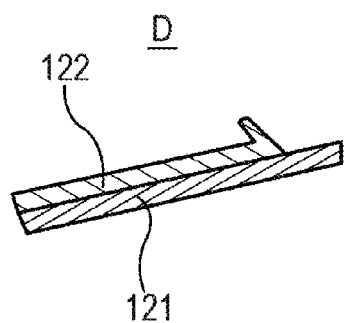
Figure 8:
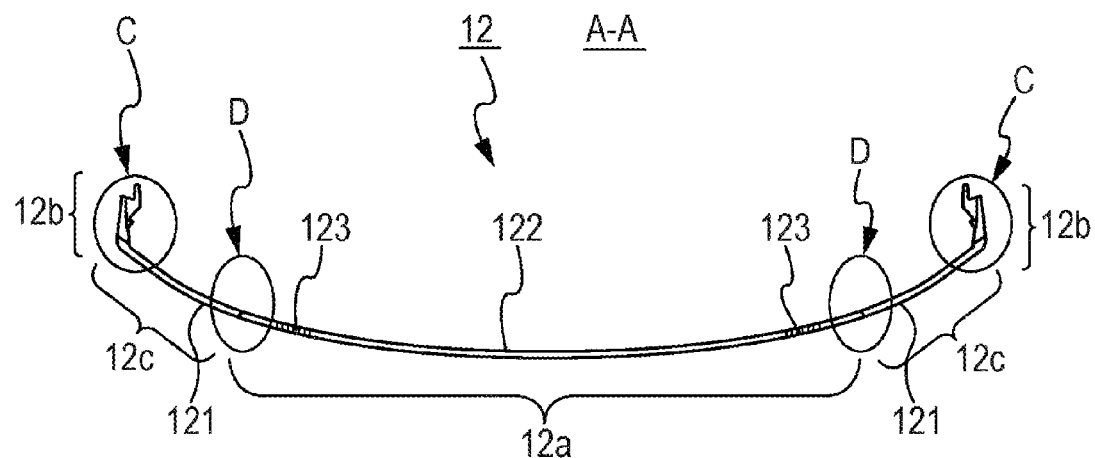
Figure 9:
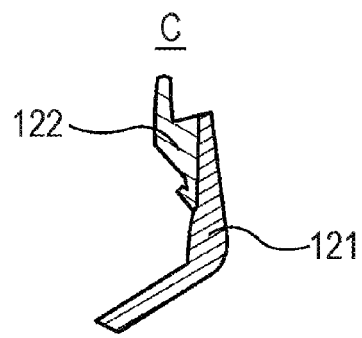
Figure 10:
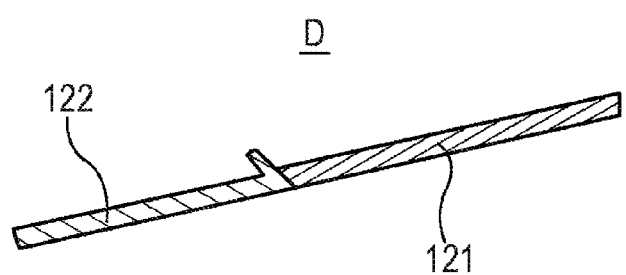

The invention and its various applications will be better understood upon reading the following description and with reference to the accompanying figures, in which:

FIG. 1 schematically illustrates a lighting device for a vehicle, said lighting device comprising a housing, at least one light source, at least one sensor and a cover, according to one non-limiting embodiment of the invention, FIG. 2 illustrates a front view of the lighting device of FIG. 1, according to one non-limiting embodiment, FIG. 3 illustrates a front view of the housing of the lighting device of FIG. 2, according to one non-limiting embodiment, FIG. 4 illustrates a rear view of the cover of the lighting device of FIG. 2, according to one non-limiting embodiment, FIG. 5 illustrates a first sectional view of said cover of FIG. 4, according to a first non-limiting embodiment, FIG. 6 illustrates a close-up view of a portion of the first sectional view of said cover of FIG. 5, according to one non-limiting embodiment, FIG. 7 illustrates a close-up view of a portion of the first sectional view of said cover of FIG. 5, according to one non-limiting embodiment, FIG. 8 illustrates a second sectional view of said cover of FIG. 4, according to a second non-limiting embodiment, FIG. 9 illustrates a close-up view of a portion of the second sectional view of said cover of FIG. 8, according to one non-limiting embodiment, FIG. 10 illustrates a close-up view of a portion of the second sectional view of said cover of FIG. 8, according to one non-limiting embodiment.

Elements that are identical, in structure or in function, and that appear in several figures use the same reference signs, unless specified otherwise.

The lighting device 1 for a vehicle 2 is described with reference to FIGS. 1 to 10. In one non-limiting embodiment, the vehicle 2 is a motor vehicle. The term motor vehicle is understood to mean any type of motorized vehicle. This embodiment is taken as a non-limiting example throughout the remainder of the description. Throughout the remainder of the description, the vehicle is thus also called a motor vehicle.

In some non-limiting examples, the lighting device 1 is a headlight or a tail light.

As illustrated in FIG. 1, in one non-limiting embodiment, the lighting device 1 comprises:
- at least one light source 10,
- at least one sensor 11,
- a cover 12,
- a housing 13.

The lighting device 1 further comprises a device 15 for controlling said at least one light source 10. In one non-limiting embodiment, the lighting device 1 comprises a plurality of light sources 10. In one non-limiting embodiment, the lighting device 1 comprises a plurality of sensors 11.

FIG. 2 illustrates one non-limiting example of a lighting device 1 which is a trunk tail light. It comprises two light sources 10 and two sensors 11. The sensors 11 are located behind the cover 12. They are thus illustrated by dashed lines in FIG. 2.

As illustrated in FIG. 3, the sensors 11 are positioned in the housing 13. The housing 13 is closed by the cover 12. The light source 10 and the sensor 11 are arranged in the housing 13. The control device 15 is also arranged in the housing 13 as illustrated in the non-limiting example of FIG. 1. It may be remote in another non-limiting example (not shown).

In one non-limiting embodiment, the light source 10 forms part of an optical module 14 illustrated in FIG. 1, said optical module 14 further comprising at least one lens and/or reflector 140. As illustrated in FIG. 1, the light source 10 is configured to emit light rays R. These light rays R have a wavelength that is in the visible range. The light rays R interact with the lens and/or the reflector 140 of said optical module 14 so as to form all or part of a primary light beam F1. Thus, in some non-limiting embodiments, the optical module 14 is configured to form all or part of a signaling beam (such as a daytime running light, position light, fog light, or indicator light), and/or of a lighting beam (such as a high beam or low beam). In one non-limiting embodiment, the light source 10 is a semiconductor light source. In one non-limiting embodiment, the semiconductor light source 10 forms part of a light-emitting diode. What is meant by light-emitting diode is any type of light-emitting diode, i.e., to give a number of non-limiting examples, LEDs (light-emitting diodes), OLEDs (organic LEDs), AMOLEDs (active-matrix organic LEDs) or FOLEDs (flexible OLEDs). In other non-limiting examples, the light source 10 is a halogen, xenon or laser light source.

The sensor 11 is configured to acquire information outside the vehicle 2 based on infrared. In one non-limiting embodiment, the sensor 11 is a lidar. The lidar 11 is configured to emit an infrared light beam F2 and to receive the echo F2' (illustrated in FIG. 1) in return in order to measure the distance from an object 3 (here a pedestrian in one non-limiting example) located outside the motor vehicle 2. The echo is the reflection of the infrared light beam F2 off said object 3. In one non-limiting embodiment, the lidar 11 measures the travel time between the emitted infrared light beam F2 and its echo F2' which is the reflected light from the infrared light beam F2. Thus, it uses the time-of-flight (TOF) technique. It is recalled that infrared has a wavelength from 700 nanometers to 1 millimeter, and the operating wavelength of a lidar is 905 nanometers. From this travel time, in a manner known to those skilled in the art, a distance from the object 3 to the motor vehicle 2 may be determined.

The cover 12 allows the housing 13 to be closed. As illustrated in FIG. 4, it comprises at least one light region 124 configured to allow the primary light beam F1 from the light source 10 to pass through. In the non-limiting example taken, it comprises two light regions 124. As illustrated in FIGS. 5 and 8, the cover 12 comprises a central portion 12a, ends 12b and edges 12c. It will be noted that the edges 12c are adjacent on each side to the central portion 12a of the cover 12 and the ends 12b are each adjacent to an edge 12c of the cover 12. In another non-limiting embodiment (not illustrated), the cover 12 does not comprise ends 12b, but only a central portion 12a and edges 12c. The non-limiting embodiment with the ends 12b is taken as non-limiting example throughout the remainder of the description.

As illustrated in FIGS. 1, 5 and 8, the cover 12 comprises:
- a first portion 121,
- a second portion 122,
- a third portion 123.

FIGS. 5 and 8 show sections of FIG. 4 along an axis AA shown in FIG. 4.

As illustrated in FIG. 1, the first portion 121 covers the light source 10. As can be seen in FIG. 1, the first portion 121 is thus arranged facing the light source 10. In one non-limiting embodiment, it is placed at a distance from the light source 10. The first portion 121 is transparent. It allows infrared and visible light to pass through. The primary light beam F1 generated by the optical module 14 passes through the first portion 121 of the cover 12 in order to illuminate a region outside the vehicle 2. In a first non-limiting embodiment illustrated in FIGS. 1 and 5, the first portion 121 also covers the sensor 11. The first portion 121 is arranged at a distance from said sensor 11. Thus, the infrared light beam F2 passes through the third portion 123 (described later on) as well as the first portion 121. In a second non-limiting embodiment illustrated in FIG. 8, the first portion 121 does not cover the sensor 11. Thus, the infrared light beam F2 passes only through the third portion 123.

In a first non-limiting embodiment illustrated in FIG. 5, the first portion 121 extends over the entire length of the cover 12 and covers the entire second portion 122 whether that is in the central portion 12a of the cover 12 or at the ends 12b of the cover 12. In one non-limiting embodiment illustrated, the first portion 121 touches the second portion 122. In FIGS. 6 and 7, it is possible to see the first portion 121 covering the second portion 122. Thus, the first portion 121 covers the second portion 122 and the third portion 123. In a second non-limiting embodiment illustrated in FIG. 8, the first portion 121 extends over part of the cover 12 and only partly covers the second portion 122 at the ends 12b as shown in FIG. 9. The first portion 121 is adjacent to the second portion 122 in the central portion 12a of the cover 12 as illustrated in FIGS. 8 and 10. If the cover 12 does not have ends 12b, the first portion 121 does not cover the second portion 122. Thus, the first portion 121 only partly covers the second portion 122 at the ends 12b of the cover 12 and not the third portion 123, or does not cover the second portion 122 or the third portion 123.

In one non-limiting embodiment, the first portion 121 of said cover 12 is made of poly(methyl methacrylate), also known as PMMA, or of polycarbonate, also known as PC. In one non-limiting variant embodiment, when the lighting device 1 is a headlight, the first portion 121 is made of PC. In one non-limiting variant embodiment, when the lighting device 1 is a tail light, the first portion 121 is made of PC or PMMA. The use of PC is explained by its mechanical strength, in particular its impact strength. In addition, when the heat is too high in the rear light, in one non-limiting variant embodiment, the first portion 121 is made of PC.

The second portion 122 acts as an esthetic element allowing the lighting device 1 to be differentiated esthetically from other lighting devices. The second portion 122 is opaque to visible light and to infrared. In one non-limiting embodiment, it may be of a different color. Thus, in some non-limiting examples, it is red, gray or black. In one non-limiting example, when the lighting device 1 is a headlight, it is black in color and when it is a tail light, it is red, gray or black in color. As illustrated in FIG. 1, the second portion 122 does not cover the sensor 11 or the light source 10. It is thus not arranged facing the sensor 11. Nor is it arranged facing the light source 10. The second portion 122 has a transmission capacity for visible light that is lower than the first portion 121; i.e. it does not allow visible light to pass through. Additionally, the second portion 122 has a transmission capacity for infrared that is lower than the third portion 123; i.e. it does not allow infrared to pass through. The primary light beam F1 generated by the optical module 14 thus cannot pass through this second portion 122. In the same way, the light beam F2 generated by the sensor 11 cannot pass through this second portion 122. Thus, it filters out visible light and infrared, i.e. their wavelengths. Thus, the second portion 122 which serves an esthetic function and therefore covers a large area of the cover 12 is not dedicated to infrared and therefore is not dedicated to the sensor 11.

In a first non-limiting embodiment illustrated in FIG. 5, the second portion 122 is completely covered by the first portion 121 over the entire length of the cover 12 whether that is in the central portion 12a of the cover 12 or at the ends 12b of the cover 12. In a second non-limiting embodiment illustrated in FIG. 8, the second portion 122 is adjacent to the first portion 121 in the central portion 12a of the cover 12b and is covered by the first portion 121 at the ends 12b of the cover 12. As illustrated in FIGS. 5 and 8, the second portion 122 extends partly over the central portion 12a of the cover 12 (except at the location of the third portion 123) and over the ends 12b of the cover 12 but not over the edges 12c of the cover 12 where the light sources 10 are located.

In one non-limiting embodiment, the second portion 122 of said cover 12 is made of poly(methyl methacrylate), also known as PMMA, or of polycarbonate, also known as PC. In one non-limiting variant embodiment, when the lighting device 1 is a headlight, the second portion 122 is made of PC. In one non-limiting variant embodiment, when the lighting device 1 is a tail light, the second portion 122 is made of PC or of PMMA. It will be noted that PC is stronger than PMMA and allows in particular the lighting device 1 (in the case of a headlight) to be protected from gravel which might be projected onto said lighting device 1 when the vehicle 2 is moving, for example. In addition, when the heat is too high in the rear light, in one non-limiting variant embodiment, the second portion 122 is made of PC.

The third portion 123 is transparent to infrared, i.e. it allows infrared light to pass through, unlike the second portion 122. The third portion 123 is opaque to visible light. It covers the sensor 11. As can be seen in FIG. 1, the third portion 123 is thus arranged facing the sensor 11. In one non-limiting embodiment, it is arranged at a distance from said sensor 11. Thus, the infrared light beam F2 generated by the sensor 11 passes through this third portion 123 and illuminates a region outside the vehicle 2. However, like for the second portion 122, visible light is filtered out by this third portion 123. When the infrared light beam F2 reaches an object 3, the corresponding light F2' reflected by the object 3 passes through the third portion 123 and is detected by the sensor 11. The third portion 123 comprises a transmission capacity for visible light that is lower than the first portion 121; i.e. the third portion 123 does not allow visible light to pass through. Thus, it filters out visible light, namely its wavelengths. As illustrated in FIG. 1, the third portion 123 is substantially centered on the sensor 11 so as to allow all of the infrared light beam F2 generated by said sensor 11 to pass therethrough and to be reflected off an object 3 that passes in front of said sensor 11. The sensor 11 is thus more effective. Furthermore, as illustrated in FIG. 5 and FIG. 8, the third portion 123 is integrated into the second portion 122. The third portion 123 represents a very limited region of the cover 12 which is thus transparent to infrared. In one non-limiting embodiment, the third portion 123 comprises an area that is substantially equal in size to the area of the sensor 11 to within an integration tolerance c for the sensor 11 in the lighting device 1 in order to be sure to completely cover the sensor 11. In one non-limiting embodiment, the integration tolerance c is between a few tenths of a millimeter and one or two millimeters. This makes it possible to take into account the dimensional tolerances for parts, of mechanical assembly sets, etc. In another non-limiting embodiment, in the case where there is a plurality of sensors 11 close to one another, the third portion 123 covers said sensors 11 in order to simplify the design of the cover 12 and improve its ease of mass production. This avoids having a small area of second portion 122 to integrate between the close-together sensors 11.

Thus, if infrared-heavy light rays come from outside and pass through the third portion 123, they do not degrade the elements (such as the electronic components or the housing) of the lighting device 1 that are located behind the cover 12, since the area of the third portion 123 is limited. Thus, the elements are not at risk of being burned. This problem is commonly called "sunburn". Furthermore, since the third portion 123 represents a limited area, the manufacturing cost is reduced. Specifically, the material for obtaining a third portion 123 that is transparent to infrared represents a certain cost. It will be noted that integrating the third portion 123 into the second portion 122 may make it possible to simplify the manufacture of the cover 12.

In a first non-limiting embodiment illustrated in FIG. 5, the third portion 123 is covered by the first portion 121 when the second portion 122 is entirely covered by the first portion 121. In one non-limiting embodiment illustrated, the third portion 123 touches the first portion 121. In a second non-limiting embodiment illustrated in FIG. 8, the third portion 123 is not covered by the first portion 121 when the second portion 122 is adjacent to the first portion 121 in the central portion 12a of the cover 12 and at the ends 12b of the cover 12.

In one non-limiting embodiment, the third portion 123 of said cover 12 is made of PMMA or of PC. In one non-limiting alternative embodiment, the third portion 123 is made of PC when the lighting device 1 is a headlight. In another non-limiting alternative embodiment, the third portion 123 is made of PC or of PMMA when the lighting device 1 is a taillight. It will be noted that the material used for the third portion 123 dedicated to the sensor 11 is more expensive than that used for the second portion 122 or the first portion 121.

The cover is produced according to a manufacturing method described below according to two embodiments.

To produce the cover 12, a mold (not illustrated) dedicated to the cover 12 is used. The mold is composed of a plurality of cavities in order to produce the cover 12, each cavity corresponding to a portion of the cover 12. Thus, the mold comprises a cavity for the first portion 121, a cavity for the second portion 122 and a cavity for the third portion 123. The first portion 121, the second portion 122 and the third portion 123 are injected into their respective cavity.

In a first non-limiting embodiment, the first portion 121, the second portion 122 and the third portion 123 are over-molded. The cover 12 is thus three-shot injected. Thus, in one non-limiting example, to obtain the first portion 121 which is coated over the second portion 122 and the third portion 123, the material of the second portion 122 is injected into the cavity of the mold provided for this purpose. Next, the material of the third portion 123 is injected into the cavity of the mold provided for this purpose, or vice versa. Lastly, the material of the first portion 121 is injected into the cavity of the mold provided for this purpose. The first portion coated over the materials of the second portion 122 and of the third portion 123 is thus obtained. Thus, said second portion 122 and said third portion 123 are covered by said first portion 121 which is coated over them. Thus, in another non-limiting example, to obtain the first portion 121, the second portion 122 and the third portion 123 arranged edge to edge, the material of the first portion 121 is injected into the cavity of the mold provided for this purpose. Next, the material of the second portion 122 is injected into the cavity of the mold provided for this purpose and the material of the third portion 123 is injected into the cavity of the mold provided for this purpose, or vice versa. Injecting the first portion 121 instead of the second portion 122 first avoids having local remelting of the material of the second portion 122 at the border regions which would be too visible.

In a second non-limiting embodiment, the first portion 121, the second portion 122 and the third portion 123 are assembled together. Thus, in one non-limiting example, the first portion 121, the second portion 122 and the third portion 123 are arranged edge to edge. In some non-limiting examples, the assembly is performed by bonding, welding, clipping, etc.

In a third non-limiting embodiment, it is possible to combine assembly and overmolding. For example, it is possible to overmold two portions together and assemble a third portion together with one or both of the other portions. Thus, two portions of said first portion 121, second portion 122 and third portion 123 are overmolded and the other portion of said first portion 121, second portion 122 and third portion 123 is assembled together with at least one of said two overmolded portions, or vice versa.

Of course, the description of the invention is not limited to the embodiments described above and to the field described above.

Thus, the described invention has the following advantages, in particular:
- it avoids damage to the elements (electronic components, housing, etc.) located behind the cover 12,
- it makes it possible to differentiate the region dedicated to the esthetic function of the cover from the region dedicated to the function of allowing infrared to pass through; thus, unlike the prior art, it does not use the entire area of the second region to let infrared pass through, but rather another area, that of the third region, to let infrared pass through,
- it makes it possible to have a smaller region of the cover 12 dedicated to the sensor 12. It thus reduces the costs for manufacturing of the cover 13.

The invention claimed is:

1. A lighting device for a vehicle comprising at least one light source, at least one sensor configured to acquire information outside the vehicle based on infrared, a housing closed by a cover, said cover comprising a first portion covering said at least one light source and a second portion that is opaque to visible light and to infrared, characterized in that said cover further comprises a third portion that is opaque to visible light and transparent to infrared, substantially centered on said at least one sensor and integrated into the second portion.

2. The lighting device as claimed in claim 1, wherein said at least one sensor is a lidar.

3. The lighting device as claimed in claim 1, wherein said lighting device comprises a plurality of light sources.

4. The lighting device as claimed in claim 1, wherein said lighting device comprises a plurality of sensors.

5. The lighting device as claimed in claim 1, wherein said cover is made of poly(methyl methacrylate) (PMMA) or of polycarbonate.

6. The lighting device as claimed in claim 1, wherein said third portion comprises a transmission capacity for visible light that is lower than the first portion.

7. The lighting device as claimed in claim 1, wherein said at least one light source is a semiconductor, halogen, xenon, or laser light source.

8. The lighting device as claimed in claim 1, wherein said lighting device is a headlight or a tail light.

9. The lighting device as claimed in claim 1, wherein said second portion and said third portion are covered by said first portion of said cover which is coated over them.

10. The lighting device as claimed in claim 1, wherein said first portion, said second portion and said third portion of said cover are arranged edge to edge.

11. The lighting device as claimed in claim 1, wherein said first portion, said second portion and said third portion of said cover are injected.

12. The lighting device as claimed in claim 11, wherein said first portion, said second portion and said third portion are overmolded.

13. The lighting device as claimed in claim 11, wherein said first portion, said second portion and said third portion are assembled together.

14. The lighting device as claimed in claim 11, wherein two portions of said first portion, second portion and third portion are overmolded and the other portion of said first portion, second portion and third portion is assembled together with at least one of said two overmolded portions, or vice versa.

15. The lighting device as claimed in claim 2, wherein said lighting device comprises a plurality of light sources.

16. The lighting device as claimed in claim 2, wherein said lighting device comprises a plurality of sensors.

17. The lighting device as claimed in claim 2, wherein said cover is made of poly(methyl methacrylate) (PMMA) or of polycarbonate (PC).

18. The lighting device as claimed in claim 2, wherein said third portion comprises a transmission capacity for visible light that is lower than the first portion.

19. The lighting device as claimed in claim 2, wherein said at least one light source is a semiconductor, halogen, xenon, or laser light source.

20. The lighting device as claimed in claim 2, wherein said lighting device is a headlight or a tail light.

* * * * *